(12) United States Patent
Bokühn et al.

(10) Patent No.: US 8,113,549 B2
(45) Date of Patent: Feb. 14, 2012

(54) COUPLING PART FOR A FLUID LINE COUPLING

(75) Inventors: Sven Bokühn, Wehr (DE); Axel Feger, Lörrach (DE); Bernd Grünmüller, Buggingen (DE); Daniel Utz, Bad Bellingen (DE); Patrick Borderie, Le Grand Lemps (FR); Jacques Boyer, St. Martin d'Uriage (FR)

(73) Assignee: A. Raymond et Cie, Grenoble (FR)

( * ) Notice: Subject to any disclaimer, the term of this patent is extended or adjusted under 35 U.S.C. 154(b) by 153 days.

(21) Appl. No.: 12/441,035

(22) PCT Filed: Sep. 6, 2007

(86) PCT No.: PCT/EP2007/007759
§ 371 (c)(1),
(2), (4) Date: Mar. 12, 2009

(87) PCT Pub. No.: WO2008/040429
PCT Pub. Date: Apr. 10, 2008

(65) Prior Publication Data
US 2010/0019483 A1    Jan. 28, 2010

(30) Foreign Application Priority Data
Oct. 4, 2006   (DE) .......................... 10 2006 047 267

(51) Int. Cl.
*F16L 39/00* (2006.01)
(52) U.S. Cl. .......................... 285/319; 285/308; 285/305
(58) Field of Classification Search .................. 285/307, 285/308, 93, 319, 305
See application file for complete search history.

(56) References Cited

U.S. PATENT DOCUMENTS
4,913,467 A * 4/1990 Washizu .......................... 285/39
(Continued)

FOREIGN PATENT DOCUMENTS
DE          4300037 C1    4/1994
(Continued)

OTHER PUBLICATIONS
The IPRP dated Jul. 3, 2007 and its English translation issued in International application No. PCT/EP2005/010996.

*Primary Examiner* — Aaron Dunwoody
(74) *Attorney, Agent, or Firm* — Faegre Baker Daniels (57) ABSTRACT

A coupling part (1) for a fluid line coupling is provided with a locking element for locking in place a plug-in part that is to be introduced into the coupling (1), and with a checking element (8) to verify proper locking of the plug-in part. The checking element (8) is equipped with axially flexible spring arms (11, 12), which comprise an engagement structure (14, 15) devised to engage with a latching structure (15), and which, in a first checking position, block the checking element (8) from shifting into a second checking position if the plug-in part is not properly locked. After the second checking position has been assumed, as a result of the actuation by the plug-in part of an actuating structure formed on each spring arm (11, 12), the checking element (8) is out of engagement with the plug-in part, and it is therefore possible to remove the plug-in part from the coupling part in the second checking position of the checking part (8), as well, by actuating the locking element (5).

8 Claims, 7 Drawing Sheets

U.S. PATENT DOCUMENTS

| | | | |
|---|---|---|---|
| 5,297,823 A | | 3/1994 | Dubost |
| 5,374,088 A | | 12/1994 | Moretti et al. |
| 5,441,313 A | * | 8/1995 | Kalahasthy ............... 285/93 |
| 5,586,792 A | | 12/1996 | Kalahasthy et al. |
| 5,683,117 A | | 11/1997 | Corbett et al. |
| 5,730,481 A | | 3/1998 | Szabo et al. |
| 5,951,063 A | | 9/1999 | Szabo |
| 6,082,779 A | | 7/2000 | Lesser et al. |
| 6,293,596 B1 | | 9/2001 | Kinder |
| 6,540,263 B1 | | 4/2003 | Sausner |
| 7,494,156 B2 | | 2/2009 | Okada |
| 7,566,077 B2 | | 7/2009 | Tsurumi |
| 7,646,970 B2 | | 1/2010 | Sakaguchi |
| 7,823,930 B2 | | 11/2010 | Feger et al. |
| 2005/0218650 A1 | * | 10/2005 | Pepe et al. ............... 285/308 |
| 2008/0150280 A1 | | 6/2008 | Feger et al. |
| 2008/0315576 A1 | | 12/2008 | Moretti et al. |
| 2010/0052313 A1 | * | 3/2010 | Ishida et al. ............... 285/93 |

FOREIGN PATENT DOCUMENTS

| | | |
|---|---|---|
| DE | 19708377 C1 | 6/1998 |
| DE | 102004062887 B3 | 10/2005 |
| DE | 102006019257 A1 | 10/2007 |
| EP | 1369634 B1 | 3/2006 |
| WO | WO98/28567 A1 | 7/1998 |
| WO | WO2005/116509 A1 | 12/2005 |
| WO | WO 2006074719 A1 * | 7/2006 |

* cited by examiner

COUPLING PART FOR A FLUID LINE COUPLING

CROSS-REFERENCE TO RELATED APPLICATION

This application is a U.S. National Phase patent application based on International Application Serial No. PCT/EP2007/007759 filed Sep. 6, 2007, the disclosure of which is hereby explicitly incorporated by reference herein.

BACKGROUND OF THE INVENTION

1. Field of the Invention

The invention is directed to a coupling part for a fluid line coupling.

2. Description of the Related Art

One known coupling part is disclosed in DE 43 00 037 C1. The prior coupling part is provided with a locking element held in a receiving portion and designed to secure a plug-in part that is configured with an annular shoulder and is to be introduced into a receiving space of the receiving portion. The locking element is configured as an annularly closed spring element, in which two pressure plates emerging from the outer side of the receiving portion have two annular portions formed on them mutually oppositely, each annular portion being configured with a respective locking catch that engages behind the annular shoulder of the plug-in part. If the plug-in part is not inserted to the proper depth into the receiving space, however, there is a risk that the plug-in part will not be properly secured in the coupling part by the locking sections engaging behind the annular shoulder.

Known from DE 10 2004 062 887 B3 is a coupling part for a fluid line coupling in which a locking element is configured both with two retaining arms, which are devised to engage behind an annular shoulder configured on a plug-in part that is to be introduced into the coupling part, and with two locking arms. The locking arms are flexible in the axial direction of the coupling part, and each has at its free end an engaging arrangement that cooperates in such a way with a locking projection configured on the coupling element that when the plug-in part is introduced to the proper depth, the engagement between the engagement structure and the locking projection is released by the action of the annular shoulder butting against the locking arms and the locking arms flexing in the insertion direction, and the locking element can be shifted from an open position into a closed position that secures the plug-in part by virtue of the re-engagement of the locking structure and the locking projection. To release the connection between the plug-in part and the locking part, however, the locking arms must again be flexed in the insertion direction in order to release the engagement between the engagement structure and the locking projection in the closed position, a manipulation which, however, is very problematic or downright impossible, especially under very tight conditions.

SUMMARY OF THE INVENTION

The present invention provides a coupling part which, while providing a reliable means of verifying the proper locking of a plug-in part in the coupling part, allows the connection between the plug-in part and the coupling part to be re-released in a relatively simple manner.

Separating the "plug-in part locking" function and the "lock checking" function makes it possible to leave the checking element in the second checking position after ascertaining that the plug-in part has been locked properly one time, and to release the plug-in part again by actuating the locking element independently of the actuation of the checking element.

In one form thereof, the present invention provides a coupling part for a fluid line coupling, including a locking element held in a receiving portion and operative to lock in place a plug-in part configured with an annular shoulder and provided to be introduced into a receiving space of the receiving portion, characterized in that a separate checking element is present that is displaceably mounted in a checking part seat, the checking element including at least one lateral spring arm that is configured to deflect in the axial direction and on which, at a free end, are configured an engagement structure and an actuating structure, and in that configured in the checking part seat is a latching structure that cooperates in such a way with the engagement structure configured on the or each spring arm that when the annular shoulder contacts the actuating structure configured on the or each spring arm, the checking element can be shifted from an otherwise locked first checking position into a second checking position in which the checking element is out of engagement with the introduced plug-in part.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

Figure 1:
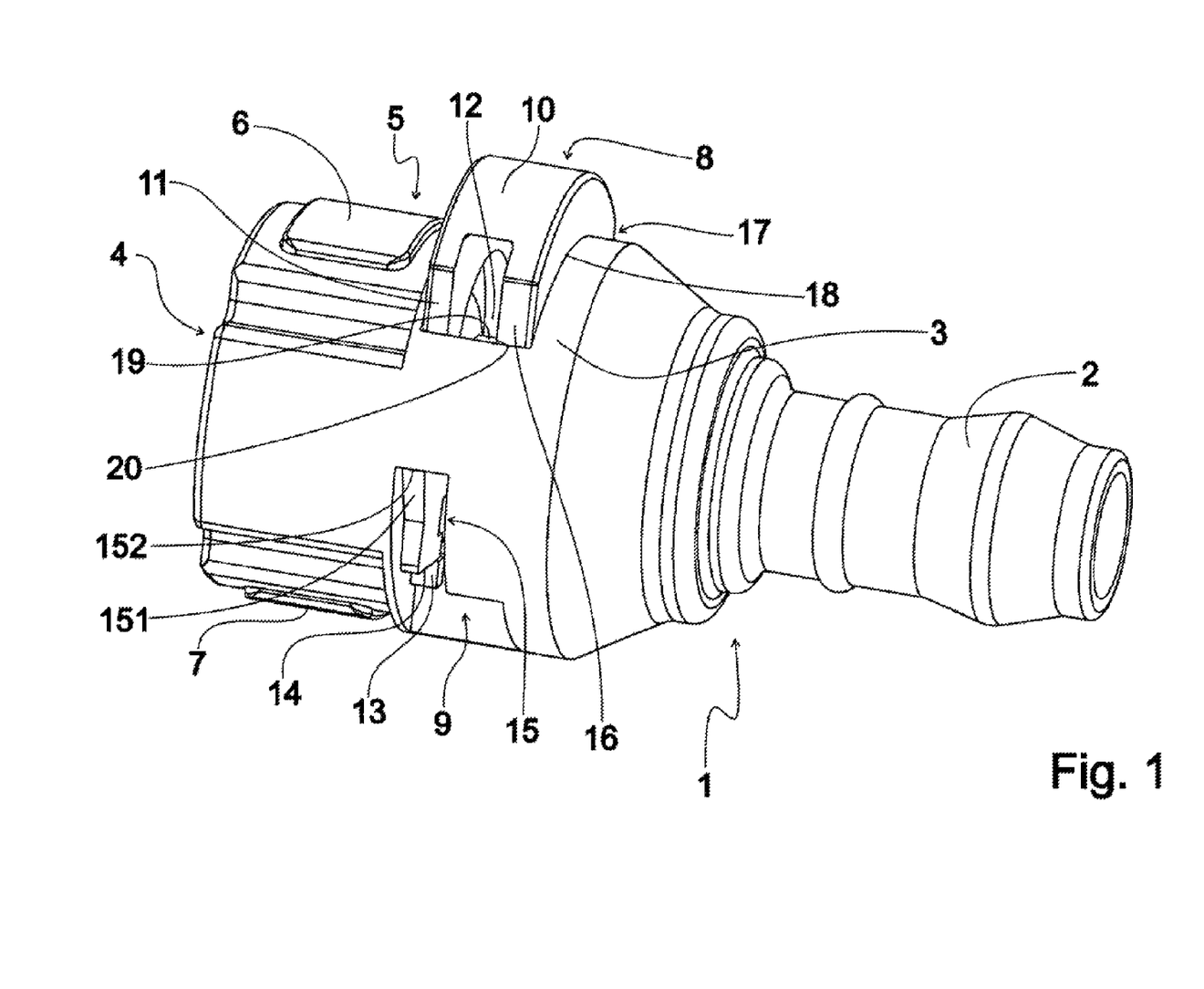
FIG. 1 is a perspective view of an exemplary embodiment of a coupling part according to the invention, comprising a checking element which is displaceable in a checking element seat arranged in a receiving portion and which is shown in a first checking position.

FIG. 1 is a perspective view of an exemplary embodiment of a coupling part 1 according to the invention. The coupling part 1 according to FIG. 1 is provided with a connecting portion 2, as part of a fluid line coupling, to effect connection to a line (not shown in FIG. 1) of a fluid line system. Connecting portion 2 stands connected to a receiving portion 3 of substantially cylindrical shape, which is substantially larger in cross section than connecting portion 2 and which surrounds an also substantially cylindrical receiving space. The receiving space is open at an insertion side 4 disposed oppositely from connecting portion 2.

In the region of receiving portion 3 adjacent to insertion side 4, coupling part 1 has a locking element 5 that is provided with two mutually opposite pressure plates 6, 7, which protrude slightly beyond the outer side of receiving portion 3 or terminate flush therewith.

The coupling part 1 according to FIG. 1 is further equipped, on the side of locking element 5 facing away from insertion side 4, with a checking element 8, which is mounted so as to be displaceable in the radial direction in receiving portion 3, in a checking element seat 9 configured therein. The checking element 8 comprises a dome section 10, which fits flush against the outer contour of receiving portion 3 in the region of checking element seat 9 and extends for a certain circumferential section over the circumference of receiving portion 3.

Formed on the side of checking element 8 facing toward locking element 5 are spring arms 11, 12, which are each positioned on a respective side in the circumferential direction and which, in the first checking position shown in FIG. 1, extend as elements of a latching structure to latching projections 13, which are disposed on the opposite side from dome section 10 and jut into checking element seat 9.

Checking element seat 9 is so dimensioned in the region of spring arms 11, 12 that spring arms 11, 12 can be flexed in the axial direction of coupling part 1, toward connecting portion 2. The latching projections 13 extend in the axial direction into checking element seat 9 for a distance such that enough space remains between their ends jutting into checking element seat 9 and the opposite wall of checking element seat 9, i.e., the wall adjacent connecting portion 2, that when flexed in the direction of connecting portion 2, spring arms 11, 12 are able to get past the latching projections 13.

In the first checking position, depicted in FIG. 1, the end faces 14 of the free ends of spring arms 11, 12, as elements of an engagement structure, butt against the latching projections 13, so that, with spring arms 11, 12 in a relaxed position, checking element 8 is blocked from sliding into checking element seat 9 beyond the first checking position illustrated in FIG. 1.

It can further be appreciated from FIG. 1 that each of the spring arms 11, 12 has, configured in the region of its free end, a respective latching recess 15 configured to mate with the respective latching projection 13 and serving as a further element of the engagement structure.

To guard the checking part 8 against inadvertently being pulled out of coupling part 1, formed on the spring arms 11, 12 are guard catches 151, which in a premounted arrangement, as for example in the first checking position, engage behind a guard surface 152 configured on receiving portion 3.

Formed on the opposite side, in the axial direction, of dome section 10 from spring arms 11, 12 are guide arms 16, 17, which are disposed between a guide wall 18, which bounds the checking element seat 9 on the side occupied by connecting portion 2, and guide walls 20 configured on intermediate webs 19.

Figure 2:
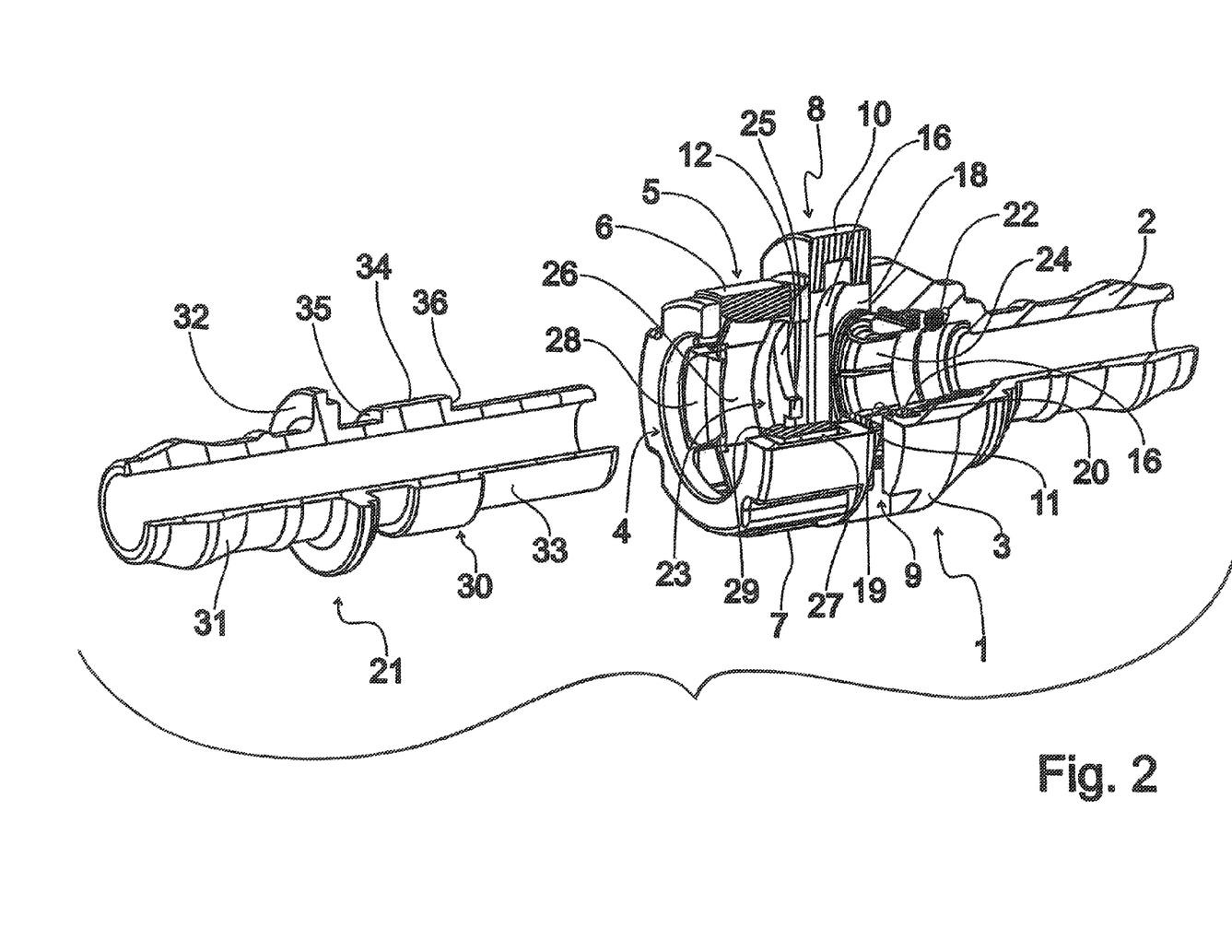
FIG. 2 is a partially cut-away perspective view of the exemplary coupling part according to FIG. 1, with a plug-in part that is to be introduced into the coupling part.

FIG. 2 is a partially cut-away perspective view of the exemplary coupling part 1 according to FIG. 1 with the checking element 8 in the first checking position, together with a plug-in part 21 that belongs to a fluid line coupling and is designed to be introduced into coupling part 1 to create a fluid line connection. It can be seen from FIG. 2 that coupling part 1 is provided with a sealing assembly 22, which is disposed at that end of receiving space 23 which is adjacent to connecting portion 2 and is held in place by a retaining ring 24 that is interlocked with the inner wall of receiving portion 3.

It can further be appreciated from the representation according to FIG. 2 that each spring arm 11, 12 has configured on it an actuating projection 25, which in the first checking position juts into receiving space 23.

Finally, it can be discerned from FIG. 2 that locking element 5 comprises annular sections 26, 27 which are relatively thin in cross section and are therefore flexible, and which extend, running circumferentially, between the pressure plates 6, 7. Formed on annular sections 26, 27 are locking catches 28, 29, which on their respective sides facing insertion side 4 are slanted in the direction of connecting portion 2 and on their respective sides facing away from insertion side 4 are oriented substantially perpendicularly radially. Said locking catches 28, 29 deflect outward when a pressure force is exerted on pressure plates 6, 7 or a radially outwardly directed force is exerted on the locking catches 28, 29.

In the exemplary embodiment according to FIG. 2, plug-in part 21 has a substantially cylindrical plug-in portion 30 and a connecting portion 31 for connection to another line (not shown in FIG. 2) of the fluid line system. Configured between plug-in portion 30 and connecting portion 31 is a radially protruding contact plate 32 with a diameter that is greater than the inner diameter of receiving space 23. Plug-in portion 30 is provided endwise with a shaft portion 33 whose outer diameter is somewhat smaller than the inner diameter of sealing assembly 22. Spacedly from contact plate 32, plug-in portion 30 has an annular shoulder 34 whose outer diameter is greater than the outer diameter of shaft portion 33 and somewhat smaller than the inner diameter of receiving space 23. On the side facing toward contact plate 32, annular shoulder 34 is provided with a reverse detention surface 35 oriented perpendicular to the outer side of shaft portion 33 and to the outer side of annular shoulder 34, and, on the side facing toward shaft portion 33, with a correspondingly radially oriented abutment surface 36.

To create a proper connection between the lines of the fluid line system that are connected to plug-in part 21 and thus to coupling part 1, plug-in part 21 must be introduced by its plug-in portion 30 far enough into receiving space 23 of coupling part 1 so that the locking catches 28, 29 of locking element 5 engage behind annular shoulder 34 and rest against rear detention surface 35.

Figure 3:
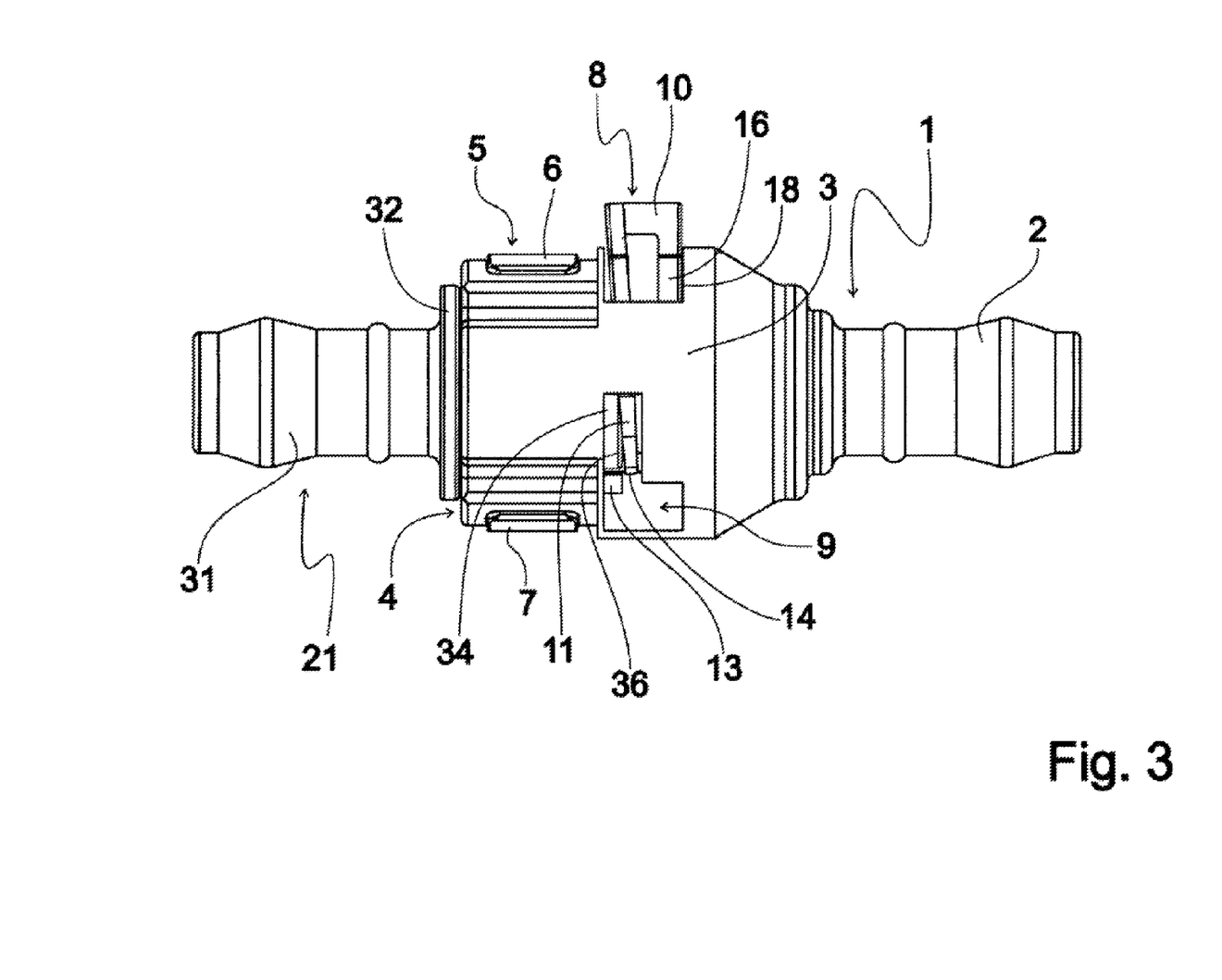
FIG. 3 shows the exemplary coupling part according to FIGS. 1 and 2 with an introduced plug-in part and with the checking element in the first checking position.

FIG. 3 is a side view of the exemplary coupling part 1 with the introduced plug-in part 21 according to FIG. 2 in the properly locked position. In this position, the abutment surface 36 of annular shoulder 34 butts against actuating projections 25, which in the first checking position jut into receiving space 23, and presses the spring arms 11, 12 in the axial direction sufficiently far toward connecting portion 2 of coupling part 1 in the insertion direction of plug-in part 21 that the engagement of the end faces 14 with the latching projections 13 is released. In this arrangement of spring arms 11, 12, checking element 8 can now be shifted into a second checking position in checking element seat 9 by the exertion of a pressure force on dome section 10.

Figure 4:
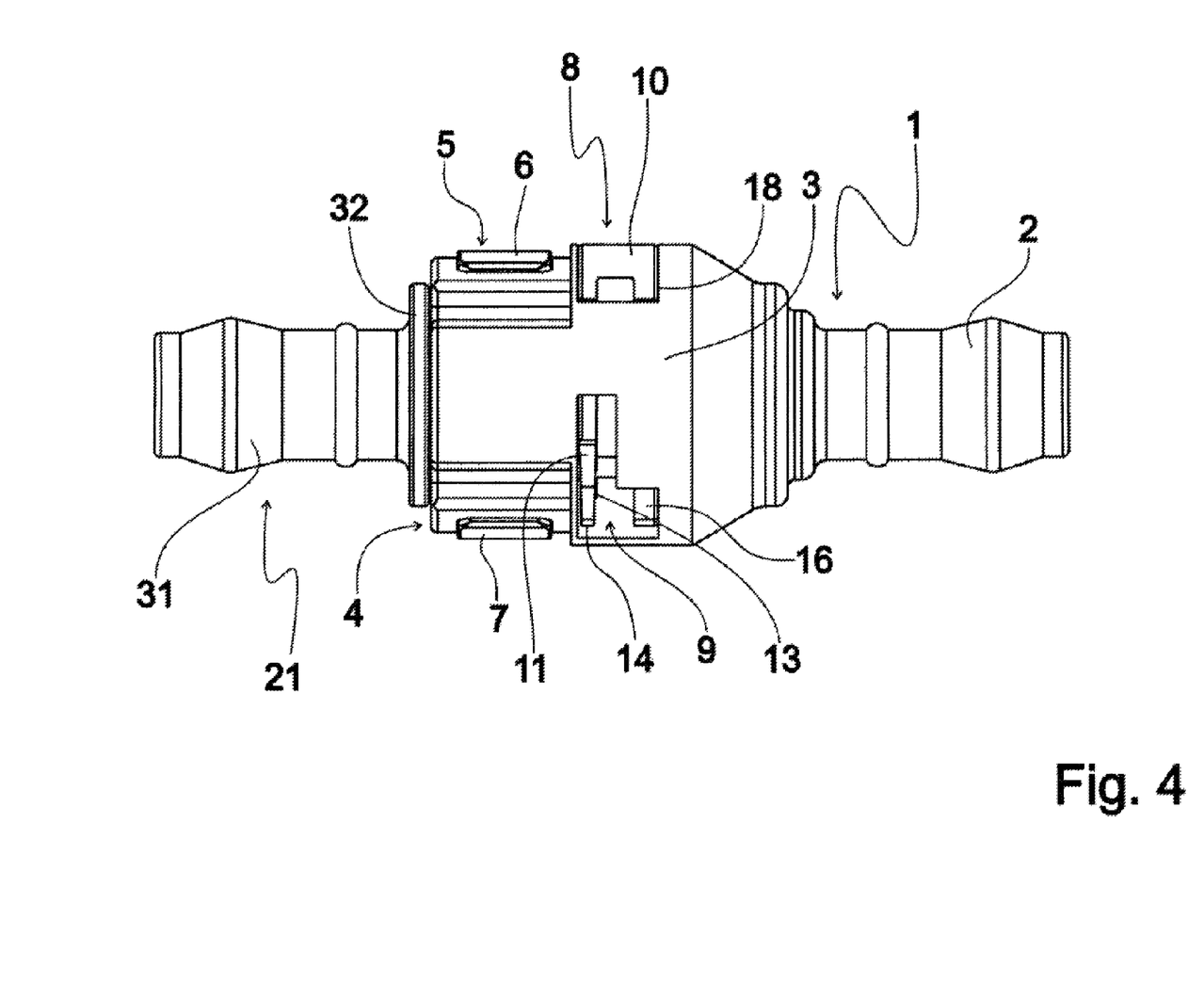
FIG. 4 shows the arrangement according to FIG. 3 with the checking element in a second checking position.

FIG. 4 shows the coupling part 1 and the plug-in part 21 in the arrangement according to FIG. 3, with the checking element 8 in the second checking position, in which dome section 10 terminates flush with the outer contour of receiving portion 3. In the second checking position, the actuating projections 25 surround shaft portion 33 on the opposite side from dome section 10, and the latching recesses 15 are in engagement with the latching projections 13. Checking element 8 is thereby locked in the second checking position, in which, however, regardless of the position of checking part 8, the engagement between the locking catches 28, 29 and the annular shoulder 34 can be released in order to remove plug-in part 21 from coupling part 1 by exerting a pressure force on the pressure plates 6, 7, without having to shift the checking element 8 from the second checking position back into the first checking position by moving the spring arms 11, 12 toward connecting portion 2 to release the engagement between the latching recesses 15 and the latching projections 13, a manipulation that would be very laborious or in some cases as good as impossible, especially under tight spatial conditions.

Nevertheless, when removing plug-in part 21 from coupling part 1, the user is still at liberty to shift the checking element 8 back into the first checking position, by releasing the engagement between the latching recesses 15 and the latching projections 13 by flexing the spring arms 11, 12 in the axial direction to connecting portion 2, to have the possibility of another lock check, if feasible and appropriate.

Figure 5:
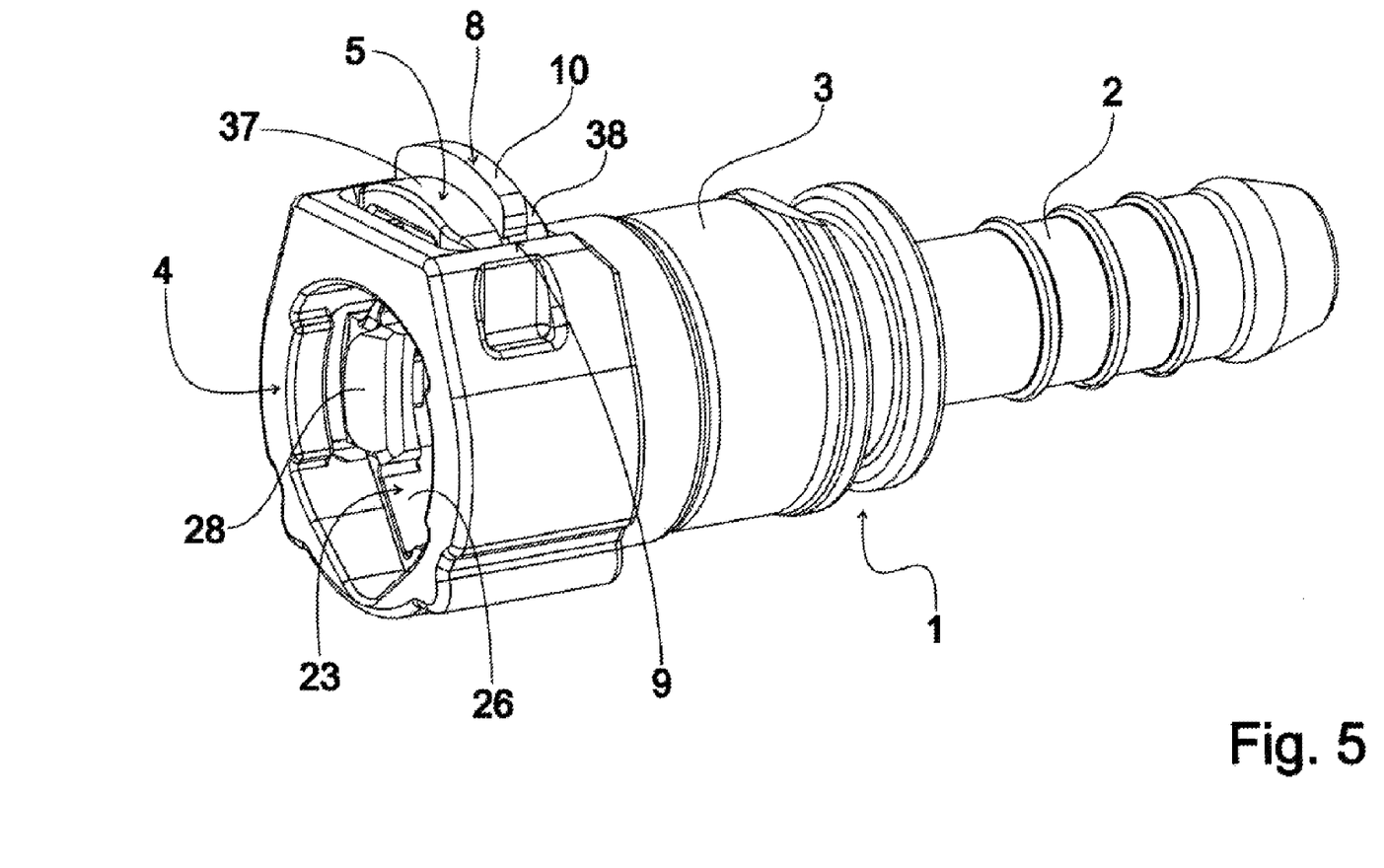
FIG. 5 is a perspective view of another exemplary embodiment of a coupling part according to the invention, comprising a checking element which is displaceable in a checking element seat arranged in a locking element and which is shown in a first checking position.

FIG. 5 is a perspective view of a further exemplary embodiment of a coupling part 1 according to the invention, it being noted that corresponding elements in the exemplary embodiment according to FIGS. 1 to 4 and the exemplary embodiment according to FIG. 5 are provided with the same reference characters and will not be described in more detail. In the exemplary embodiment according to FIG. 5, the locking element 5 is configured with a first pressure plate section 37, facing the insertion side 4, and a second pressure plate section 38, facing the connecting portion 2, each arranged on a respective side of a checking part seat 9 configured in the locking element 5. The dome section 10 of checking element 8, which in the exemplary embodiment according to FIG. 5 is configured solely with two spring arms 11, 12 (not visible in the representation according to FIG. 5), is disposed between pressure plate sections 37, 38, and protrudes beyond pressure plate sections 37, 38 in the first checking position, illustrated in FIG. 5, of checking element 8.

Figure 6:
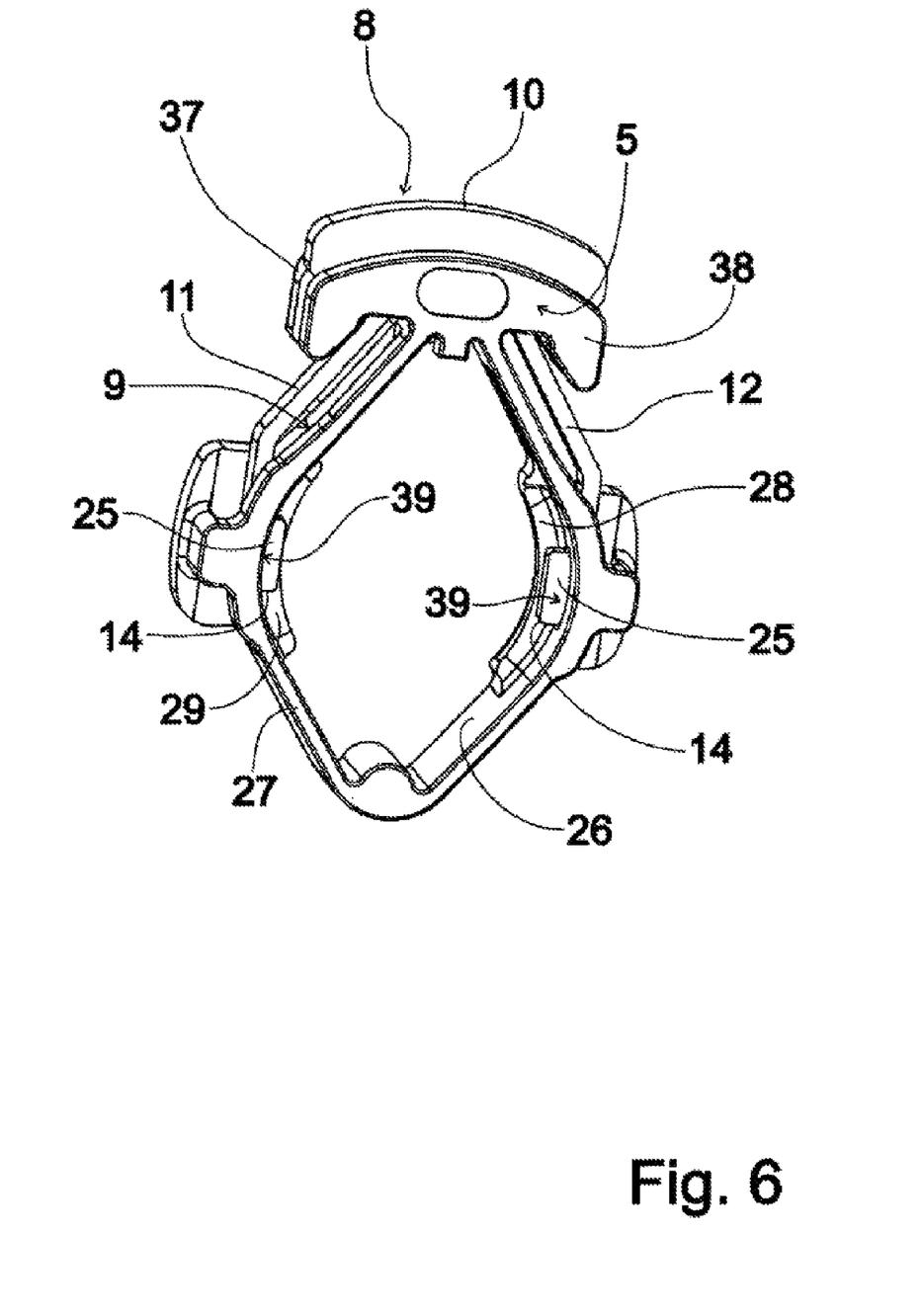
FIG. 6 is a perspective view of the checking element and the locking element according to FIG. 5 in the first checking position.

FIG. 6 is a perspective view of the locking element 5 with checking element 8 in the first checking position, the point of view being toward the side that faces connecting portion 2. It is evident from FIG. 6 that each spring arm 11, 12, which is guided with no play in the axial direction within checking element seat 9, has as an actuating structure an actuating projection 25, on which, as an engagement structure, the end face 14 remote from dome section 10 butts against the wall of an actuating-projection seat 39 configured in the particular spring arm 11, 12 and blocks the checking element 8, in the first checking position, against sliding all the way into the second checking position should the locking catches 28, 29 have failed to engage behind the annular shoulder 34 of a plug-in part 21 not shown in FIG. 6.

Figure 7:
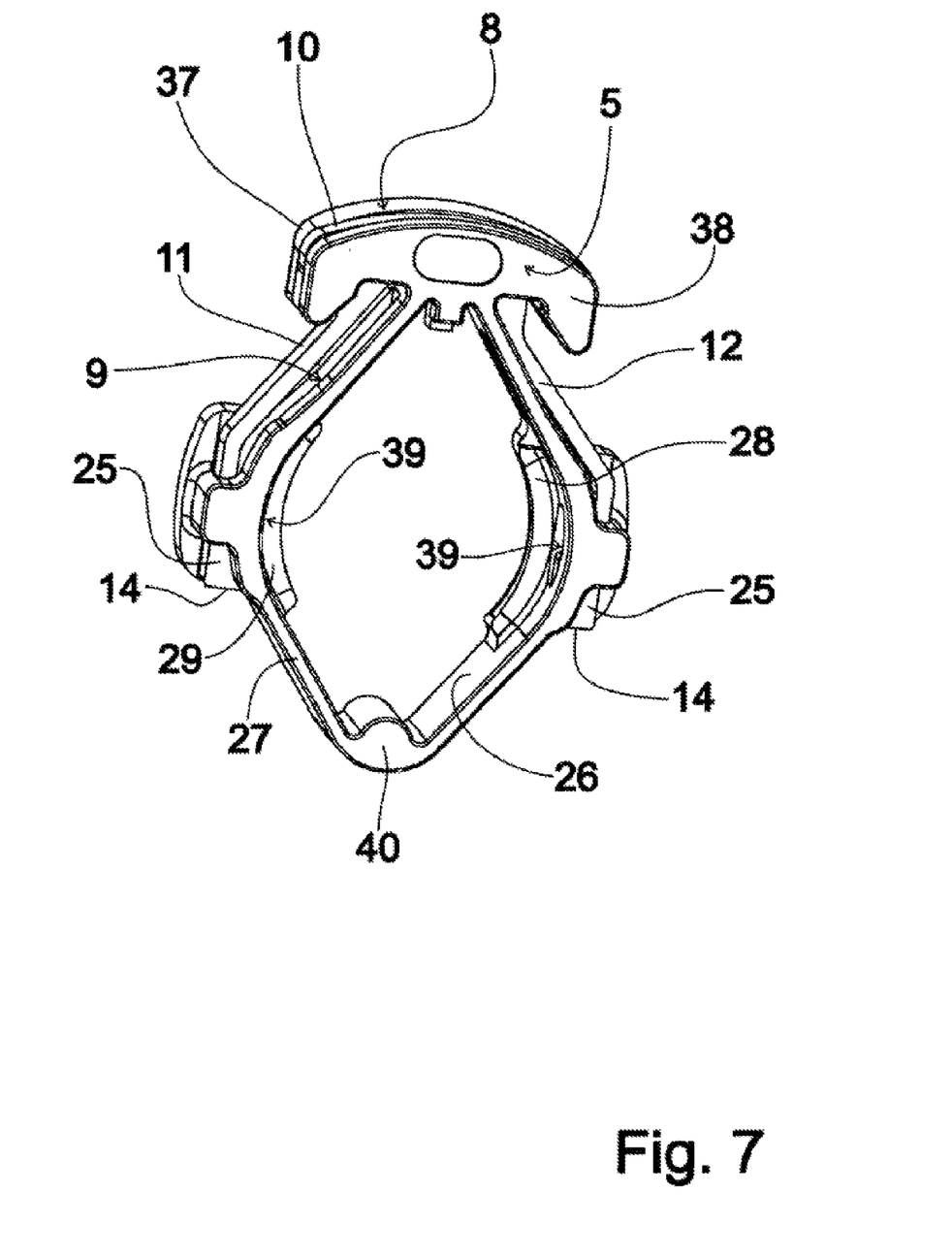
FIG. 7 is a perspective view of the checking element and the locking element according to FIGS. 5 and 6 in a second checking position.

FIG. 7 shows the locking element 5 and the checking element 8 in a representation according to FIG. 6 in the second checking position, in which, after the rearward engagement of the annular shoulder 34 of a plug-in part 21, the annular shoulder 34 has pressed the actuating projection 25 so far radially outward that the engagement between the end faces 14 of the locking projections 25 and the wall of actuating-projection seat 39, which wall is slanted in the region of end faces 14, is cancelled, and checking element 8 can be slid all the way into checking element seat 9 by exerting a pressure force on dome section 10. The fact that in the second checking position, the outer side of dome section 10 and the respective outer sides of the pressure plates 37, 38 no longer terminate flush with one another furnishes a reliable indication of proper engagement between the locking element 5 and the plug-in part 21.

In the second checking position of checking part 8, the engagement between locking element 5 and plug-in part 21 is cancelled by the exertion of a pressure force on pressure plate sections 37, 38, thereby causing locking catches 28, 29 to move radially outward as a result of the bracing against receiving portion 3 of a connecting portion 40 that is configured between the ends of annular sections 26, 27 that are remote from pressure plate sections 37, 38.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A coupling part having an axial direction and a radial direction, the axial and radial directions perpendicular to one another, comprising:
   a receiving portion including a receiving space;
   a plug-in part receivable within said receiving space, said plug-in part including an annular shoulder;
   a locking element displaceably disposed in said receiving portion and operative to lock said plug-in part within said receiving space;
   a checking element separate from said locking element, said checking element displaceably mounted in a checking part seat of said receiving portion for movement in the radial direction independently of said locking element between first and second checking positions, said checking element including at least one lateral spring arm having a length extending in the radial direction and deflectable in the axial direction, each said spring arm including an actuating structure and a free end having an engagement structure, said actuating structure and said engagement structure spaced from one another along said length of said spring arm; and
   a latching structure associated with said checking part seat, said latching structure cooperating with said engagement structure whereby, upon contact of said annular shoulder of said plug-in part with said actuating structure, said checking element is shiftable in the radial direction from said first checking position to said second checking position in which said checking element is out of engagement with said plug-in part.

2. The coupling part of claim 1, wherein said latching structure includes a latching projection associated with a respective spring arm and projecting into said checking part seat.

3. The coupling part of claim 2, wherein said engagement structure includes an end face configured endwise on each said spring arm, said end face in abutment with said latching projection in said first checking position.

4. The coupling part of claim 2, wherein said engagement structure includes a latching recess, said latching projection engaging said latching recess in said second checking position.

5. The coupling part of claim 1, wherein said actuating structure includes an actuating projection which, in said first checking position of said checking element, projects into said receiving space and in said second checking position, is disposed externally of said receiving space.

6. The coupling part of claim 1, including two said spring arms connected to each other via a dome section.

7. The coupling part of claim 6, wherein said dome section in said first checking position protrudes in said radial direction beyond said receiving portion and in said second checking position is flush with an outer side of said receiving portion.

8. The coupling part of claim 1, wherein said checking element includes at least one guide arm disposed between two guide walls configured in said checking element seat.

* * * * *